United States Patent [19]

Vorobiev et al.

[11] Patent Number: 4,548,165

[45] Date of Patent: Oct. 22, 1985

[54] INTERNAL COMBUSTION ENGINE

[75] Inventors: Ivan Y. Vorobiev; Viktor M. Zharnov; Viktor D. Naumenko, all of Minsk, U.S.S.R.

[73] Assignee: Minsky Motorny Zavod, Minsk, U.S.S.R.

[21] Appl. No.: 531,714

[22] Filed: Sep. 13, 1983

[51] Int. Cl.[4] .......................... F02F 11/00; F16J 15/06
[52] U.S. Cl. ................................. 123/41.84; 123/668; 277/235 B
[58] Field of Search ............ 123/41.84, 193 R, 193 C, 123/193 CH, 313, 668, 669, 41.83; 277/235 B

[56] References Cited

U.S. PATENT DOCUMENTS

| 1,880,643 | 10/1932 | Woolson | 123/193 R |
|---|---|---|---|
| 3,448,986 | 6/1969 | Jelinek et al. | 277/235 B |
| 3,606,361 | 9/1971 | Pohl et al. | 277/235 B |
| 3,882,842 | 5/1975 | Bailey et al. | 123/193 C |
| 4,103,913 | 8/1978 | McDowell | 277/235 B |
| 4,244,330 | 1/1981 | Baugh et al. | 123/41.84 |
| 4,440,118 | 4/1984 | Stang et al. | 123/41.84 |

FOREIGN PATENT DOCUMENTS

| 535707 | 1/1957 | Canada | 277/235 B |
|---|---|---|---|
| 2816383 | 10/1979 | Fed. Rep. of Germany | 277/235 B |

OTHER PUBLICATIONS

Du Pont Company, Teflon for Gaskets and Packings, 1957.
"Design of Rubber and Asbestos Components of Soviet and Foreign Tractor Engines," Series: Tractors, Self-Propelled Undercarriages and Engines, published by the Central Research Institute for the Tractor and Agricultural Machinery Industry, Moscow, 1972, p. 62, FIG. 15.

Primary Examiner—Ira S. Lazarus
Assistant Examiner—David A. Okonsky
Attorney, Agent, or Firm—Fleit, Jacobson, Cohn & Price

[57] ABSTRACT

An internal combustion engine comprises an engine block having mounted thereon a cylinder head and a cylinder head gasket interposed between the engine block and the cylinder head, this gasket having cylinder holes of a diameter substantially greater than the cylinder bore, these cylinder holes of the gasket having inserted thereinto continuous or split annular shaping rims. Each shaping rim is fashioned as a deformable body with an element for attachment thereof to the cylinder head gasket. The size of the deformable body of the shaping rim is commensurable with the volume of a gas space enclosed by the cylinder head, cylinder head gasket, engine block and the continuation of the wall of the cylinder bore, the deformable body of the shaping rim engaging with the surfaces of the cylinder head and engine block confined between the cylinder hole of the gasket and the continuation of the wall of the cylinder bore of the internal combustion engine.

3 Claims, 10 Drawing Figures

INTERNAL COMBUSTION ENGINE

FIELD OF THE INVENTION

This invention relates to engine constructions, and more particularly to the constructions of internal combustion engines.

INDUSTRIAL APPLICABILITY

The invention can find application in most piston-type internal combustion engines, such as those used in motor vehicles, ships, locomotives, etc., as well as in stationary engines used for driving generators, compressors and the like and having interposed between an engine block and a cylinder head a cylinder head gasket with cylinder holes of a diameter greater than the diameter of cylinder bores; the aim of the invention being to reduce the specific consumption of fuel, fume emission and toxicity of exhaust gases, as well as to increase the reliability and extend the service life of the cylinder head gasket.

BACKGROUND OF THE INVENTION

At present, the problems of improving the fuel economy, reducing the fume emission and toxic ehxaust of internal combustion engines have become very urgent. A great number of theoretical studies, experiments and inventions were directed toward the solution of these problems.

One line in this direction was to increase the ratio of the volume of the combustion chamber to the compression volume. An increase in this ratio is normally attained by reducing the compression volume, which can in turn be achieved through reducing the volume determined by the clearance or space between the piston and the cylinder head, the volume of the valve seat recesses, the volume between the piston and cylinder when the piston is at top dead center, and the volume occupied by a gas space the presence of which is determined by that due to structural and technological considerations the cylinder holes in the cylinder head gasket are greater in diameter than the cylinder bores. As a rule, the abovementioned volumes are selected in the course of experimental engine improvement and therefore can be reduced exclusively through the application of specific structural modifications. One of the locations where such structural novelties can be applied is the gas space (cylinder head joint) of the engine.

There is known an internal combustion engine (cf. USSR Inventor's Certificate No. 482,561; IPC F 02 B 11/00) in which for reducing the specific fuel consumption, fume emission and toxic exhausts, as well as for a more reliable and dependable service of the cylinder head gasket, the upper end face of a cylinder liner is provided with an annular groove in which a shaped metal ring is placed.

However, this construction fails to provide for complete filling of the volume of the gas space in the cylinder head joint, since a free area remains between the cylinder head and the upper end face of the cylinder liner's fire shoulder. Also, the abovedescribed construction requires the use of special cylinder liners; in other words, it cannot find application in internal combustion engines already in service.

There is further known an internal combustion engine (cf. USSR Inventor's Certificate No. 848,722; IPC F 02 F 11/00 and F 16 J 15/06) wherein for the same purpose a ring element of a soft material is placed on a cylinder liner shoulder, this shoulder being provided with spiral grooves in which the material of the ring element is pressed when the cylinder head is mounted on the engine block.

Inherein in the above construction is a disadvantage residing in that the entire volume of a gas space in the cylinder head joint, that is the space between the cylinder head and the upper end face of the fire shoulder of the cylinder liner, remains unoccupied; in addition, the provision of spiral grooves in the cylinder liner is a necessary requirement.

Another internal combustion engine is known (cf. U.S. Pat. No. 3,606,361; IPC F 16 J 15/06) wherein the dead gas volume is occupied by a steel ring having sharp projections on the opposite faces and inserted into a cylinder hole of a cylinder head gasket.

This construction likewise fails to provide for filling the entire volume of the gas space in the cylinder head joint, because unoccupied space remains between the faces of the steel ring, cylinder head and engine block, while the sharp projections may tend to cut into the cylinder head and the engine block in close proximity to the cylinder bore to cause excessive out-of-roundness. In addition, these projections may fail to fit indentations formed during initial mounting of the cylinder head when the latter is remounted, which results in poor sealing.

SUMMARY OF THE INVENTION

It is an object of the present invention to reduce the specific consumption of fuel by an internal combustion engine.

Another object is to reduce the fume emission and exhaust toxicity of the internal combustion engine.

One more object is to make a cylinder head gasket of the internal combustion engine more reliable and durable.

These objects are attained by that in an internal combustion engine comprising an engine block having mounted thereon a cylinder head and a cylinder head gasket interposed between the engine block and the cylinder head, this gasket having cylinder holes of a diameter substantially greater than the cylinder bore, these cylinder holes of the gasket having inserted thereinto continuous or split annular shaping rims, according to the invention, each shaping rim is fashioned as a deformable body with elements for attachment thereof to the cylinder head gasket, the size of the deformable body being commensurable with the volume of a gas space enclosed by the cylinder head, cylinder head gasket, engine block and the continuation of the wall of the cylinder bore, the deformable body of the shaping rim engaging with the surfaces of the cylinder head and the engine block confined between the cylinder hole of the cylinder head gasket and the continuation of the wall of the cylinder bore of the internal combustion engine.

The above arrangement of the shaping rim provides for complete filling of the dead gas space in the cylinder head joint, which reduces the compression volume of the engine and, as a consequence, results in a higher ratio of the combustion volume to the compression volume. Further, this enables to prevent the surfaces of the engine block and the cylinder head engageable with the deformable body of the shaping rim from participating in active heat transfer between the combustion gas and the surfaces of the compression chamber, which makes it possible to utilize more fully the heat developed during engine operation. The aforedescribed, therefore, facilitates a greater fuel economy, reduces fume emission and exhaust toxicity, and improves the reliability and durability of the cylinder head gasket.

For reducing heat transfer between the combustion gas and the shaping rim of the cylinder head gasket, the rim is preferably fabricated from a heat-insulating material, such as fluoroplastic.

According to the research data cited by the magazine "Avtomobilnaya promyshlennost" No. 7, 1981 in the Article entitled "Vliyanie otnosheniya ob'ema kamery sgoraniya k ob'emu szhatiya na pokazateli rabochego protsessa dvigatelya" (in Russian), complete occupation of a gas space in the cylinder head joint provides a reduction in the specific fuel consumption by 3.8%, as well as a considerable decrease in fume exhausts and toxic engine emissions.

The results of a service test of an internal combustion engine embodying the features of this invention, particularly employing gasket rims of fluoroplastic, have shown a three to four times extension in the life of the cylinder head gasket.

When the engine block of an internal combustion engine has cylinder liners provided with fire shoulders, the deformable body of the shaping rim of the cylinder head gasket is preferably of stepped configuration, with a flat portion thereof engaging with the cylinder head, while a stepped portion thereof engages by one step with an end face of the cylinder liner and by another step with an upper surface of the fire shoulder.

Such a construction of the gasket rim body makes it possible to completely fill the volume of a dead gas space confined between the fire shoulder and the cylinder head; it also affords to avoid out-of-roundness of the cylinder liners during mounting the cylinder head.

For simplifying the attachment of the shaping rim in the cylinder holes of the cylinder head gasket, the elements for attaching these rims to the gasket are preferably fashioned as separate or spaced triangulars having recesses to receive the gasket.

One advantageous feature of the disclosed internal combustion engine construction is that it can be easily used both with newly designed engines and the engines which are in operation by adding to the conventional cylinder head gasket a shaping rim of proper configuration without alterations in other engine parts.

BRIEF DESCRIPTION OF THE ACCOMPANYING DRAWINGS

The invention will now be described in greater detail with reference to various specific embodiments thereof taken in conjunction with the accompanying drawings, in which.

DETAILED DESCRIPTION OF THE INVENTION

Figure 8:
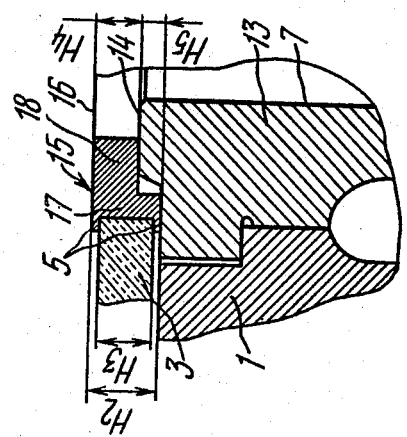
FIG. 8 shows an engine block with a cylinder liner and a cylinder head gasket provided with a stepped shaping rim according to the invention.

An internal combustion engine (FIG. 1) comprises an engine block 1 having secured thereon a cylinder head 2. Interposed between the engine block 1 and the cylinder head 2 is a cylinder head gasket 3 having a cylinder hole of a diameter in excess of the cylinder bore. The cylinder hole of the gasket 3 accommodates an annular shaping rim 4 comprising elements 5 for attachment to the gasket 3 and a deformable body 6. The size of the body 6 of the annular shaping rim 4 is such as to be commensurable with a gas space defined by the engine block 1, cylinder head 2, gasket 3 and continuation of wall 7 of the cylinder bore. The deformable body 6 of the annular shaping rim 4 comes into contact with the surfaces of the cylinder head 2 and engine block 1 confined by the cylinder hole in the gasket 3 and by the continuation of the wall 7 of the cylinder bore.

Figure 1:
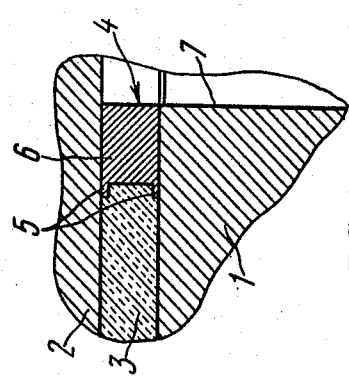
FIG. 1 illustrates an internal combustion engine constructed according to the invention.

The position of the shaping rim 4 at the assembled internal combustion engine represented in FIG. 1 is attained by a structural arrangement thereof and subjecting its body 6 to deformation during assembly of the internal combustion engine subsequent to the application of pressure to the cylinder head 2. To ensure a more optimized filling of the volume of the gas space with minimum of forces applied to the cylinder head 2, the rim 4 is fabricated from a material capable of cold flow at a per unit area pressure of below 1,500 kg/cm$^2$ and capable to withstand a maximum temperature for extended operation of not less than 230° C., this material being preferably fluoroplastic.

Described hereinbelow are various modified forms of the shaping rim 4 of the gasket 3, which may have the form of a continuous or split ring.

Figure 2:
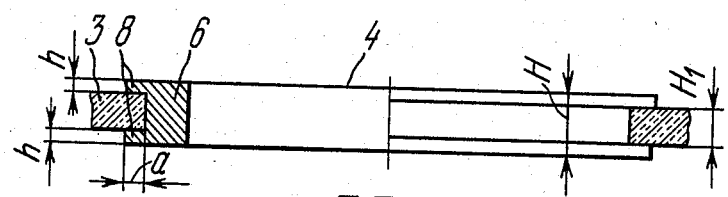
FIGS. 2, 3, 4 and 5 show various forms of arrangement of a shaping rim of a cylinder head gasket according to the invention.
Figure 3:
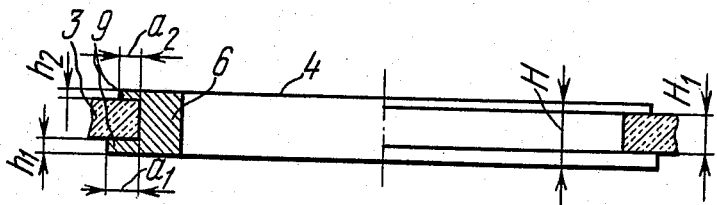
Figure 4:
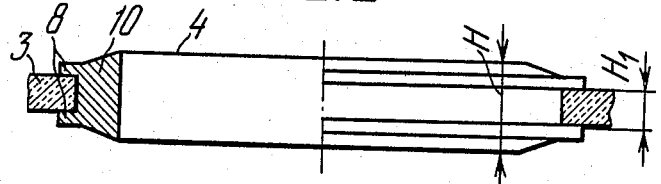
Figure 5:
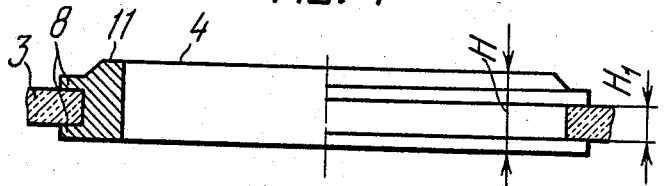

With reference to FIG. 2, the shaping rim has a body indicated by 6 and elements for attachment to the gasket 3 in the form of shoulders 8 having a height "h" and a width "a" selected depending on the desired distribution of forces exerted on the engine block 1 and the cylinder head 2 (FIG. 1) during mounting the cylinder head 2 on the internal combustion engine. The shoulders 8 (FIG. 2) have the height "h" and width "a", although depending on the above considerations shoulders 9 (FIG. 3) of the shaping rim 4 may vary in height and width, e.g., "$h_1$" > "$h_2$" and "$a_1$" > "$a_2$". The shoulders 8 and 9 (FIGS. 2, 3, 4 and 5) engage with bodies 6, 10, 11 of the shaping rim 4, the size of which is commensurable with the volume of the gas space of the internal combustion engine.

For more complete filling of the volume of the gas space at the minimum of efforts applied to the cylinder head 2 (FIG. 1) and for reducing the radial pressure exerted on the edge of the cylinder hole in the gasket 3, the deformable bodies 10, 11 (FIGS. 4 and 5) of the shaping rim 4 may have the greatest height "H" on the side facing the cylinder bore wall 7 (FIG. 1).

The height "H" of the body 6, 10, 11 (FIGS. 2, 3, 4, and 5) of the shaping rim 4 must always be in excess of the thickness "$H_1$" of the gasket 3.

With such an arrangement of the shaping rim 4 the body 6, 10, 11 thereof is deformed during mounting the cylinder head 2 (FIG. 1) to provide for reliable sealing of the cylinder bore 7 of the internal combustion engine and prevent high temperature and pressure gases from acting on the surface of the cylinder hole in the gasket 3 thereby improving its reliability and extending its service life.

Figure 6:
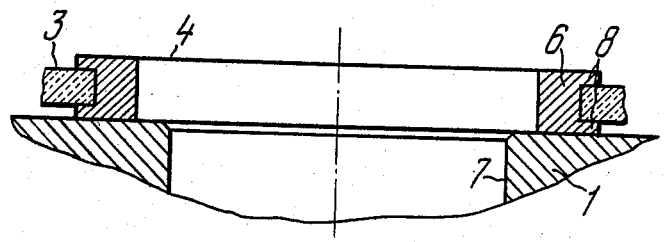
FIG. 6 illustrates a cylinder head gasket provided with a shaping rim installed on an engine block.

Referring now to FIG. 6, the shaping rim 4 is first secured in the cylinder hole of the gasket 3 to be thereafter placed on the engine block 1.

During mounting of the cylinder head 2 (FIG. 1) and pressing it against the engine block 1, the body 6 of the shaping rim 4 is deformed to fill the volume of the gas space and assume the position best seen in FIG. 1.

The internal combustion engine embodying the features of the present invention operates in a conventional manner: its piston during the compression stroke moves upwards toward the top dead center compressing the air in the cylinder 7 (FIG. 1) to a compression volume. Because the volume of the gas space is filled with the deformed body 6 of the shaping rim 4, this compression volume is reduced by the value of the volume occupied by the gas space; conversely, since the volume of the compression chamber remains invariable, the ratio between the volume of the compression chamber and the compression volume is increased, and the air which should have occupied the volume of the gas space without participating in fuel mixing and consequently failing to facilitate fuel combustion moves toward the combustion chamber to actively participate in fuel mixing and facilitate combustion, whereby specific consumption of fuel is reduced, and the fume emission and toxicity of the internal combustion engine become less pronounced.

In addition, the thus deformed body 6 of the shaping rim 4 made it possible to completely prevent the surfaces of the engine block 1 and the cylinder head 2 which are in contact with the deformed body 6 of the rim 4 from participating in active heat transfer between the hot combustion gas and the surface of the compression chamber, which increases the extent of heat utilization in the internal combustion engine, i.e. brings down the specific consumption of fuel.

The use for the shaping rim 4 of such heat-insulating material as fluoroplastic further increases the extent of utilization of heat in the internal combustion engine, because heat losses through the surface of the rim 4 facing the cylinder bore 7 are reduced.

The deformed body of the rim 4, while contacting the surfaces of the engine block 1 and cylinder head 2, acts to reliably insulate the surface of the cylinder hole in the gasket 3 from high temperature high pressure combustion gases produced during operation of the internal combustion engine to result in improved reliability and extended service life of the gasket 3.

The efficiency of the invention has been checked on various mass-produced internal combustion engines. Depending on the volume of the gas space, reduction in the specific consumption of fuel at rated operating conditions amounted to 2.5–5%, smoke emission was less by 15%–25%, along with the accompanying reduction in the concentration of nitrogen oxides, hydrocarbons and carbon oxides in the exhaust gases.

The results of service tests have shown that cylinder head gaskets fabricated according to the features of the present invention grew in reliability and durability three-to four-fold.

Figure 7:
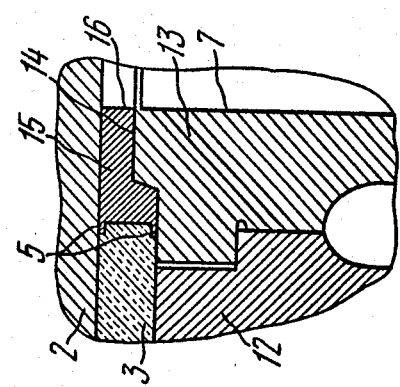
FIG. 7 is a modified form of the internal combustion engine provided with cylinder liners.

With reference to FIG. 7, there is shown an alternative modification of the internal combustion engine wherein an engine block 12 is provided with a cylinder liner 13 having a fire shoulder 14 on the end face of the cylinder liner 13 to form a stepped liner end surface. In this case, a deformable body 15 of a shaping rim 16 may also be of stepped configuration, a flat portion thereof engaging with the surface of the cylinder head 2, while its stepped portion contacts by one step the end face of the cylinder liner 13 and by another step the top surface of the fire shoulder 14.

This shaping rim 16 (FIG. 8) with the stepped body 15 must be fabricated such that the height "$H_2$" of a larger step 17 would be greater than the thickness "$H_3$" of the gasket 3, and height "$H_4$" of a smaller step 18 would be greater than a difference between the thickness "$H_3$" of the gasket 3 and the height "$H_5$" of the fire shoulder 14.

The stepped configuration of the body 15 of the shaping rim 16 and the use of fluoroplastic as the material of the rim 16 makes it possible to completely fill the shaped configuration of the volume of the gas space and preclude out-of-roundness of the cylinder liner 13 during mounting of the cylinder head 2 (FIG. 7).

Figure 9:
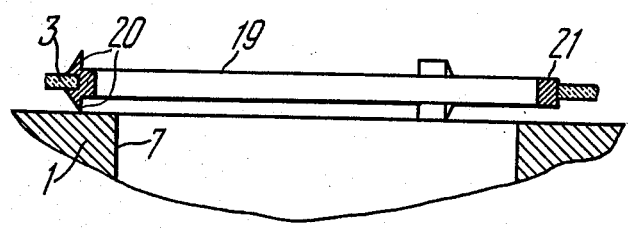
FIG. 9 is a modified form of attachment of the shaping rim to the gasket by means of special clamps in the form of triangulars.
Figure 10:
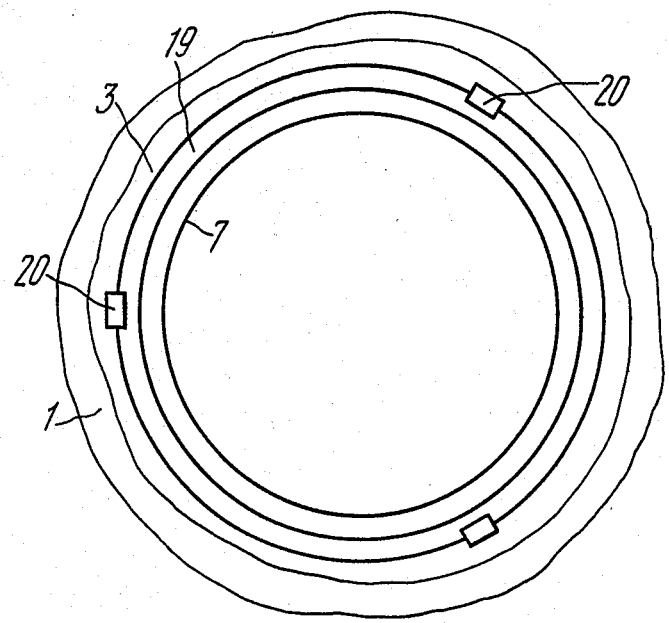
FIG. 10 is a top plan view of FIG. 9.

Referring now to FIGS. 9 and 10, for a more reliable mounting of a shaping rim 19 the cylinder hole of the gasket 3 may be provided with elements for attachment of the rim 19 to the gasket 3 in the form of spaced triangulars 20 having recesses to receive the gasket 3. The triangulars 20 are arranged on a body 21 of the rim 19 on the side adjacent the cylinder hole of the gasket 3. The above arrangement of the attachment elements of the rim 19 enables to automate fitting the rim 19 on the gasket 3.

It is important that the construction of the internal combustion engine according to the invention may be used with equal success both when designing a novel engine and for internal combustion engine currently produced or in operation, because it differs from the conventional engine construction by only one element, particularly the shaping rim, which can be added to the engines of standard construction without any alterations therein.

What is claimed is:

1. An internal combustion engine comprising:
   an engine block;
   a cylinder head;
   a cylinder head gasket interposed between said engine block and said cylinder head;
   cylindrical bores defined by the engine block
   a cylinder liner located within each cylndrical bore, said cylinder liners each including a stepped cross-section having an upper surface defining a fire shoulder and an end face;;
   cylindrical holes defined by the cylinder head gasket, said cylindrical holes having a diameter greater than the internal diameter of the cylindrical liners; and
   annular shaping rims located in said cylindrical holes of said gasket, each annular shaping rim including a deformable body and elements securing said shaping rim to said cylinder head gasket, said deformable body being of a stepped configuration, a stepped portion of said deformable body engaging by one step said end face of said cylinder liner and engaging by another step said fire shoulder, said deformable body further engaging said cylinder head 2. An internal combustion engine as defined in claim 1 wherein said shaping rim is fabricated from a heat-insulating material, such as fluoroplastic.

3. An internal combustion engine as defined in claim 1, wherein said elements of said shaping rim form a plurality of triangles.

* * * * *